2 Sheets—Sheet 1.

N. C. STILES.

DROP HAMMER.

No. 10,324. Reissued May 8, 1883.

Witnesses,
J. H. Shumway
Jos. C. Earle

Norman C. Stiles
Inventor
By atty.
Wm. D. Earle

N. C. STILES.

DROP HAMMER.

No. 10,324. Reissued May 8, 1883.

Witnesses.

J. N. Shumway

Jos. A. Earle.

Norman C. Stiles
Inventor

By Atty.

Wm. D. Earle

UNITED STATES PATENT OFFICE.

NORMAN C. STILES, OF MIDDLETOWN, CONNECTICUT.

DROP-HAMMER

SPECIFICATION forming part of Reissued Letters Patent No. 10,324, dated May 8, 1883.

Original No. 270,146, dated January 2, 1883. Application for reissue filed April 16, 1883.

*To all whom it may concern:*

Be it known that I, NORMAN C. STILES, of Middletown, in the county of Middlesex and State of Connecticut, have invented a new Improvement in Drop-Hammers; and I do hereby declare the following, when taken in connection with accompanying drawings and the letters of reference marked thereon, to be a full, clear, and exact description of the same, and which said drawings constitute part of this specification, and represent, in—

Figure 1:
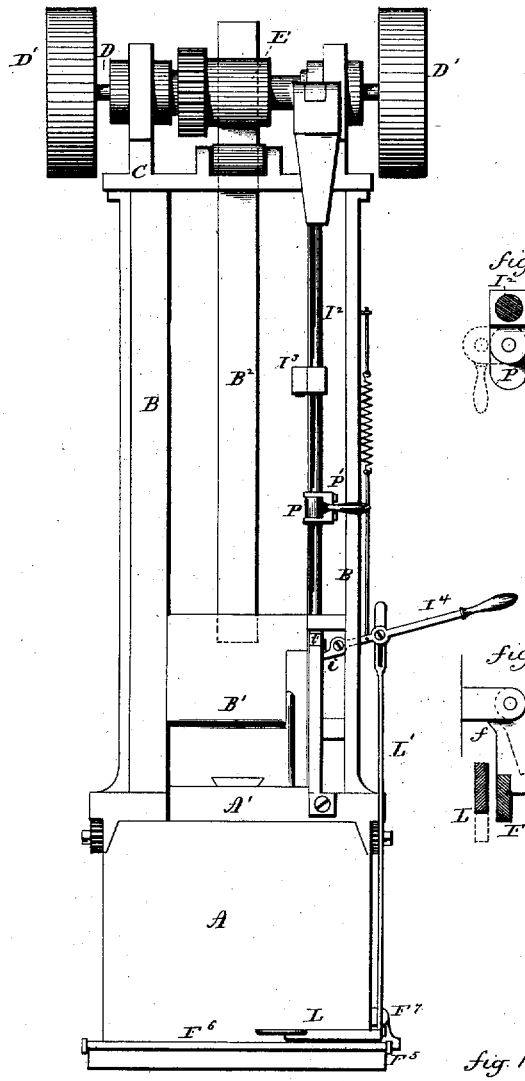
Figure 2:
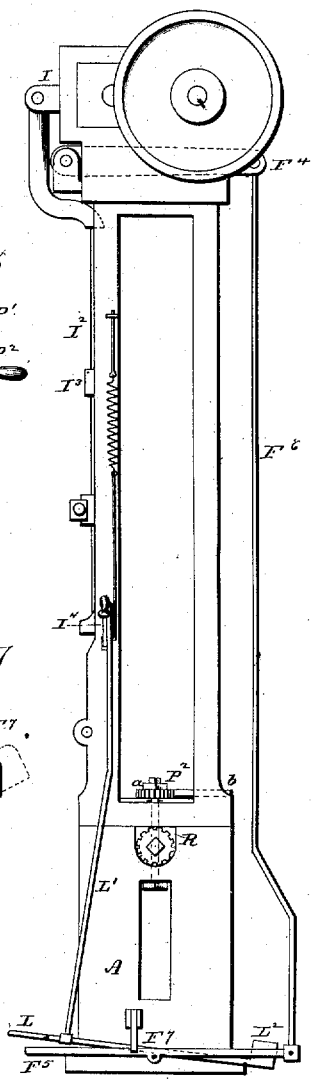
Figure 8:
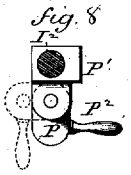
Figure 7:
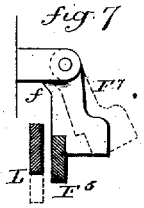
Figure 3:
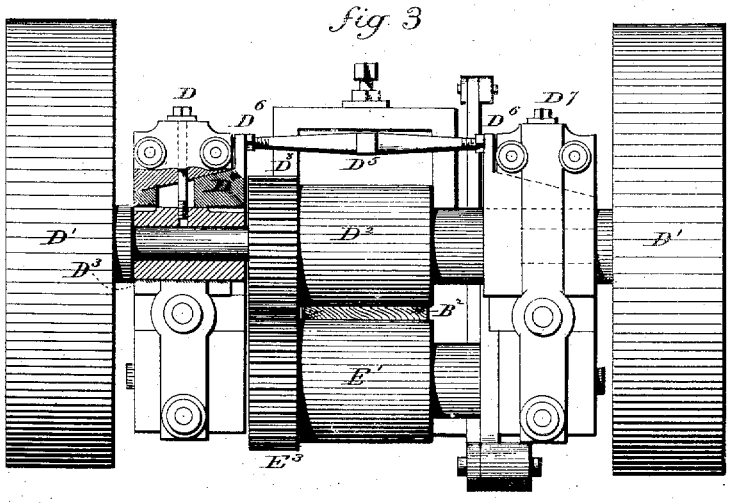
Figure 4:
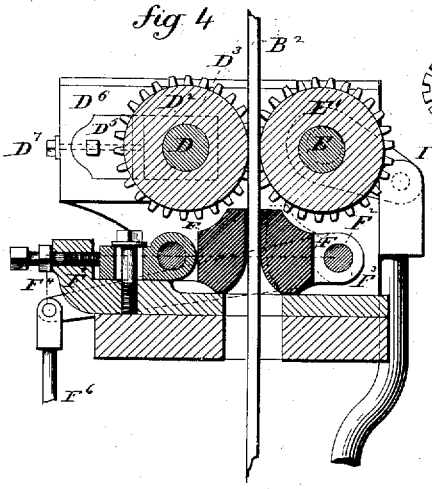

Figure 1, a front view; Fig. 2, a side view; Fig. 3, a top view, partial section enlarged; Fig. 4, a transverse section through the lifting and holding mechanism; Figs. 5 to 14, inclusive, detached views.

This invention relates to an improvement in drop-hammers of that class in which the hammer is lifted by means of the friction of the revolving rolls against the bar or strap which extends up from the hammer, and is an improvement on the drop-hammer for which Letters Patent of the United States were granted to me March 2, 1875, No. 160,483, but applicable to other drops of similar character. In this class of drops one of the rolls which raise the hammer is hung upon an eccentric bearing, so that by turning the said bearing in one direction the roll is made to approach the other and to grasp the strap between the two rolls, and so that the revolution of the rolls will raise the hammer; or if the bearing be turned in the opposite direction, then the roll will be moved back from the strap to release the hammer and permit it to fall. This movement of the roll in my patent referred to is produced through a rod, which stands in vertical guides on the uprights and in connection with the eccentric bearing of the movable roll, so that when the rod is free its weight will apply the clamping-pressure of the movable roll upon the strap which supports the hammer and cause the hammer to rise. As the hammer ascends it strikes the stop on the rod and raises the rod, which throws the movable roll back away from and so as to release its grasp upon the strap and permit the hammer to drop. As the hammer raises the rod a latch springs in beneath some point on the rod near its lower end, so as to catch and hold the rod in its raised position until the hammer, in completing its stroke, trips the latch so as to permit the rod to fall, which makes a re-engagement of the movable roll upon the strap to cause the hammer to rise again, as before, and will so continue its operation so long as the hammer is permitted to raise the rod on its upstroke and trip it on its descent; but if the rod be held in its up position, then the lifting mechanism is disengaged from the hammer, and no further operation will occur until the rod be released.

It is necessary that the hammer should be held suspended above the anvil, and not to rest thereon, as it would do without some other device than the lifting mechanism. To this end there is in connection with this raising device a pair of clamps, which will grasp the strap when its rising movement ceases and hold it suspended until the operative releases the strap from the grasp of the said clamps, which is readily done by means of a foot-pedal in connection with the said clamps, the descent of the hammer applying the power to again raise it, as before described, so that unless the foot be upon the pedal to hold the said clamps open only a single blow will be struck.

In practice it frequently occurs that the workman desires continuous strokes, and also to vary those strokes according to the work to be done—that is, to make succeeding strokes lighter or heavier than preceding strokes. In my patent before referred to provision was made for this variation of stroke by the hand of the operator; but to attend to the manipulation of the piece being forged with one hand and with the other adjust the stroke, while one foot is engaged to cause the continuous stroke, as before mentioned, is very difficult to do, and often necessitates the employment of a helper.

The objects of this invention are to bring the adjustment of the hammer entirely within the control of the foot of the operator; also, to make an adjustable stop, whereby the ascent of the hammer may be adjusted to different elevations while in motion; also, to provide a mechanical adjustment for other parts of the machine; and the invention consists, first, in the combination of pedals and connections with the operative mechanism, whereby by means of one foot the operator may cause single blows or a succession of blows, or by the same foot may vary the stroke of successive blows; and, also, in a stop adjustable on the stop-rod out of or into the path of the hammer, and in other details of construction, as more fully hereinafter described.

A is the bed which supports the operative mechanism, and on which the anvil A′ is set.

B B are the uprights or posts, between which the hammer B′ is arranged in substantially the usual manner, so as to move freely up and down, guided by the said uprights.

$B^2$ is the strap or bar which is attached to the hammer, and by which it is raised.

Upon the upper end of the posts the frame C, on which the operative mechanism is placed, is secured in the usual manner.

Figure 5:
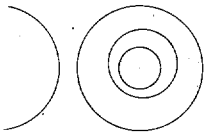
Figure 6:
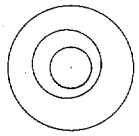

The driving-shaft D carries upon its outer ends the driving-pulleys D′, by which power is communicated to the mechanism. On the shaft D a roll, $D^2$, is fixed, and forward of the driving-shaft a second shaft, E, is arranged in suitable bearings parallel to the driving-shaft, and on which is a corresponding roll, E′. The two rolls are geared together, as seen in Figs. 3 and 4, so that they turn in opposite directions. Between the two rolls the strap or bar $B^2$ passes, and, if pressing against the bar $B^2$ with sufficient force, they will cause the hammer to rise until the pressure of the rolls upon the bar is relaxed. Then the hammer will fall, unless otherwise prevented. The second shaft, E, with its drum E′, is made adjustable, so that the roll will approach or recede from the other roll. By arranging the shaft E in eccentric bearings $E^2$, as seen in Fig. 5, so that by turning the bearing $E^2$, say, to the position seen in Fig. 6, the roll E′ will be drawn away from the other roll, or, when returned, will force the roll E toward the other roll, so as to come into active contact with the hammer-bar, substantially as in my patent before referred to.

Beneath the rolls a pair of clamps, F F′, are arranged, as seen in Fig. 4, the one F′ hung loose upon a shaft, $F^2$, the bearings $F^3$ of which are eccentric to the axis of the shaft, and to this shaft a lever, $F^4$, is attached, so that by raising the said lever, as denoted in broken lines, Fig. 4, the shaft $F^2$ will draw the clamp F′ backward or away from the other clamp, F; but when forward and in position as seen in Fig. 4 they lie close against the respective surfaces of the hammer-bar $B^2$ and clamp the bar between them, so as to hold it up and prevent the descent of the hammer, but allow it to be moved freely upward. The faces of the clamps are cam-shaped or eccentric to the shaft upon which they are hung, so that the downward strain upon the hammer-bar only tends to draw the clamps upon the bar. The hammer rises freely; but so soon as the power which raised it is relaxed the clamps engage and hold the hammer suspended until the clamping device be released, as before described, the same as in my invention before referred to—that is to say, by means of a treadle, $F^5$, connected to the end of said lever by a rod, $F^6$. The pressure of the foot upon said treadle turns the lever to throw back the clamp, as before described.

It is necessary that the position of the clamps F F shall correspond to the position of the rolls above, and as the rolls must be adjustable according to the thickness of the hammer-bar, if the clamps be rigidly hung, there is liability of clashing in the work between the two, necessitating a very nice adjustment of the clamps with relation to the rolls. To obviate this difficulty and make the clamps self-adjusting with relation to the rolls, I hang them upon a plate, $F^3$, as seen in Fig. 4, and independent of the bed on which the rolls are hung, leaving that plate which carries the clamps free to slide on the bed beneath the rolls. Hence when the hammer-bar is in its place between the rolls it serves to locate the clamps and keep them in their proper relative position to the rolls, and any change of position of the hammer-bar due to the adjustment or operation of the rolls will impart a corresponding change of position to the clamps, so that under all circumstances the clamps are automatically adjusted with relation to the rolls.

Figure 14:
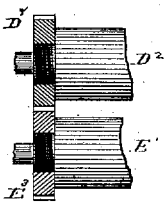

As usually constructed, the pinions between the rolls are cast with the rolls, so as to insure their proper relative position, as well as to prevent the possibility of their turning independent of the rolls. These pinions, being of cast-iron, wear quickly. The teeth frequently break and require renewal. To obviate this difficulty I make the gears $D^3$ and $E^3$ independent of the rolls, and of steel, and cut screw-threads upon the roll-shafts and corresponding screw-threads in the respective gears, so that the gears are screwed onto the shafts hard against a shoulder thereon, as seen in Fig. 14. The direction of the threads corresponds to the direction of the lifting strain upon the rolls, so that the tendency of the lifting is to turn the gears onto their respective shafts. By making these gears independent they are easily replaced when required, and by making them of steel they are more durable than cast-iron gears can be, and by screw-threading them onto their respective shafts it is impossible for them to become loose or play upon the shafts.

Figure 9:
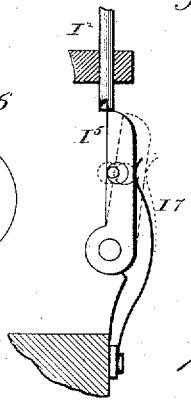

The bearings which support the movable roll E′ are turned, as before described, by means of a lever, I, and a rod, $I^2$, extending down close by one of the guides for the hammer, as seen in Figs. 1, 2, and 4. On this rod $I^2$ the upper stop, $I^3$, is arranged in the path of the hammer, so that when the hammer ascends it will strike the said stop, raise the rod, and turn the eccentric bearing of the roll E′ to move the said roll away from the hammer-bar. As the rod $I^2$ is raised a spring-latch, $I^5$, is thrown beneath its lower end, or a suitable stop on the rod, as seen in Fig. 9, which holds the rod in its raised position and the movable roll away from the hammer-bar, so as to permit the free descent of the hammer. Then as the hammer approaches the anvil an incline, $I^6$, on the hammer (see Fig. 9) strikes a projecting stud, $I^7$, on the latch $I^5$ and throws the latch out from beneath the rod $I^2$, as seen in broken lines, Fig. 9, which permits the rod to drop. The weight of the rod then brings the movable roll back into clamped engagement with the hammer-bar, so that the hammer is again raised, as before, and will thus continue to rise and fall.

As different dies vary in height, and the work performed by the dies necessarily causes the hammer to stop at different distances from the face of the anvil, if the incline $I^6$ be arranged so as to strike the projection or stud $I^7$ at the lowest point of descent of the hammer, then, when different dies are introduced or different work being done which will prevent the hammer from coming down to this low point, the incline $I^6$ would not be sufficient to throw the latch out from beneath the rod $I^2$; hence I make the projecting stud $I^7$ eccentric, as seen in Fig. 9, which may be turned toward or from the hammer, as indicated in broken lines, to cause it to be hit sooner or later by the incline $I^6$, according to the descent of the hammer.

So far the construction of the machine is substantially the same as in my previous patent. In this construction, if the operator desires successive blows of the hammer, he must depress the pedal $F^5$ with one foot to relieve the clamping device, which arrests the descent of the hammer. Then, if he desires a variation of blows of the hammer, he can only do it by means of the hand-lever $I^4$, hung to the frame, so that its short arm *i* comes beneath a stop, *i'*, on the rod $I^2$, (see Fig. 1,) by means of which he can raise the rod $I^2$ at any time he desires, and thereby release the hammer from the action of the rolls and permit its descent; but this he cannot practically do, and must necessarily rely upon his helper to operate the lever $I^4$; but it is impossible to give to that helper the judgment necessary in many classes of forging. In order to bring this adjustment within the control of the operator himself, I arrange a second pedal, L, hung upon the side of the frame, and connected by a rod, L', to the lever $I^4$ outside its pivot, so that by depressing the pedal L the lever $I^4$ will be turned to raise the rod. The pedal L therefore serves the purpose of releasing the power at any time the operator may desire; but it is arranged independent of the pedal $F^5$, so that the pedal $F^5$ may be operated regardless of the pedal L; but as the pedal L is only required for adjusting the stroke of the hammer when it is moving up and down, the pedal $F^5$ must be held down. Hence a foot-bar, $F^6$, extends along the front of the base from the pedal $F^5$ and beneath the pedal L, so that when the operator places his foot upon the pedal L and forces that down the same pressure also forces down the pedal $F^5$, and when so pressed down it is engaged and held down by means of a latch, $F^7$, (see Fig. 7,) which falls over it; but when the pedal L rises to its full height it strikes an incline, *f*, on said latch and turns it outward from over the pedal $F^5$, as seen in broken lines, Fig. 7, so as to leave that pedal $F^5$ free to rise; hence when the pedal L is up, as in broken lines, Fig. 7, the other pedal, $F^5$, is free to be pressed down or rise up. When the pedal L is pressed down into active operation the pedal $F^5$ will be also pressed down, and will be caught and held until released by the rising of the pedal L.

Supposing that the operation only requires regular single blows, the operator simply depresses the pedal $F^5$ in the usual manner, which permits the hammer to descend and rise to the same extent so long as he holds the pedal down, (it being understood that the normal or stationary position of the hammer is up suspended between the clamps.) Now, supposing he requires variable blows, he places his foot upon the pedal L and depresses that, together with the pedal $F^5$, until he brings the pedal $F^5$ into engagement with the latch $F^7$, which releases the hammer and permits it to fall. Then it immediately commences its ascent, as before, and when it has risen to the required ascent the operator again depresses the lever L to raise the rod $I^2$ and release the grip of the rolls, to enable the hammer to descend from that point, and so continuing, the ascent of the hammer may be arrested at any point wherever the operator chooses to depress the pedal L, and thereby release the hammer from the action of the rolls. The movement of the pedal in its operation is entirely below the incline *f* on the latch, so that while the operator is thus manipulating the pedal L the pedal $F^5$ is not disengaged; but when he takes his foot from the pedal L, then that pedal rises automatically by the force of a weight, $L^2$, or other device up to its position seen in broken lines, Fig. 7, so as to throw the latch $F^7$ out of engagement with and so as to free the pedal $F^5$ and permit that pedal to rise to re-engage the clamps with the hammer-bar. This engagement with the latch $F^7$ can only occur when the pedal L is depressed. By this arrangement, then, the operator has the extent of stroke of the hammer entirely under control of his foot, his hands left free for other work.

It frequently occurs that in operation successive strokes of one length are required. To provide for such requirement I arrange an adjustable stop, P. This stop P is hinged in a block, P', secured to the rod $I^2$ at the point where the short stroke is required to begin, but may be adjustable on the rod to any point within the stroke of the hammer. This stop P is provided with a handle, $P^2$, convenient for the operator, so that he may turn from the position seen in Figs. 1 and 8, which is out of the path of the hammer, into the path of the hammer, as seen in broken lines, Fig. 8, and so that the hammer, when it next ascends, will strike the stop and raise the rod to release the hammer, as before described, and, when the longer stroke is again required, return the stop out of the path of the hammer, so as to permit it to rise to the extreme stop above. The block may be set upon the rod by set-screws or other devices, it only being necessary that it shall be adjustably secured to the rod.

The combination of the two pedals may be employed for other lifting or holding devices. I therefore do not wish to be understood as limiting their use to the particular lifting and holding mechanism herein described.

The lifting-bar $B^2$ is usually made from wood, or from other material with which the surface of the rolls will readily engage with frictional force sufficient to raise the hammer. Constant use reduces the thickness of the bar; hence unless some adjustment be provided for the rolls relatively to each other, the gripping of the movable roll will diminish as the thickness of the bar diminishes. Again, such adjustment of the roll is necessary in the introduction of the bars, as they will unavoidably vary in thickness. To this end I arrange the shaft for the stationary roll $D^2$ in movable boxes or bearings $D^3$, (see Fig. 3 and broken lines, Fig. 4,) that is movable toward and from the bearings of the other roll, E'; and outside the bearings $D^3$, I arrange a wedge, $D^4$, the one at one bearing inclined opposite to that on the other bearing, as seen in Fig. 3, and these two wedges are connected by a right-and-left-hand-threaded screw, $D^5$—that is, one end of the screw is right-hand-threaded and the other left-hand-threaded and correspondingly screwed into the wedges or an arm, $D^6$, projecting therefrom. The body of the screw, or at some point between its two ends, is made angular in shape, so as to be readily turned. Then by turning the screw in one direction the two edges will be moved to force the boxes and the shaft and roll they carry toward the other roll, and, turned in the opposite direction, will withdraw the wedges and permit that roll to recede or be moved away from the other roll. These wedges form a firm and solid bearing against the boxes and permit the ready and easy adjustment of one roll with relation to the other. For the purpose of drawing the boxes back against the wedges when the wedges shall have been withdrawn, I apply a screw, $D^7$, to the two boxes, which extends out to the front, and so that by turning the screws in one direction the boxes will be drawn toward the wedges, or, loosened, will permit the wedges to be forced inward to move the boxes in the opposite direction.

Figure 10:
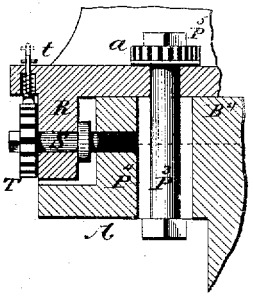
Figure 11:
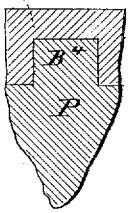
Figure 11:
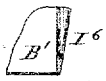

In the construction of the machine, and on on account of wear, it is necessary, or desirable at least, that the uprights should be adjustable relatively to each other; but if this be done by bolts through slots the jar from the blows of the hammer loosens the nuts, so that a constant resetting of nuts is necessary. To obviate this difficulty I make the connection between the uprights and the base as seen in Figs. 10 and 11. I construct the upright B with a groove, $B^3$, in its lower end, the grooves running inward toward the guiding-edge, and on the base I form a corresponding tongue, $B^4$. (See Fig. 11.) This groove and tongue locate the upright as to its transverse position. To secure the upright, a bolt, $P^3$, is introduced through a slot, $P^4$, in the base up through the flange on the upright, preferably its head below, and on its upper end a nut, $P^5$, is applied to bind the two parts together. To prevent the jar of the working hammer from loosening the nut, it is provided with a notched flange, *a*, into which a spring-bolt, *b*, is arranged to engage, as seen in Figs. 2 and 11, this bolt operating as a dog in the notches of the flange on the nut, so that the nut cannot be turned until the dog is withdrawn. To adjust one upright toward or from the other, an ear, R, extends down from the foot of the upright, and in this ear a screw, S, is arranged, held free for rotation, but without longitudinal movement, as seen in Fig. 10, the threaded portion of the bolt entering a correspondingly-threaded hole in the anvil, so that by turning the bolt S the upright will be moved toward or from the opposite upright, according to which way the bolt is turned. To prevent the jar from the hammer turning this adjusting bolt or screw, I provide it with a flanged collar, T, on its outside, and combine with that collar a spring-dog, *t*, (see Figs. 11 and 12,) which, while holding the adjusting-screw firmly, will permit that screw being turned whenever the dog is drawn from engagement with it, as indicated in broken lines, Fig. 10.

Figure 13:
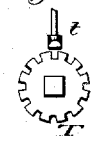
Figure 12:
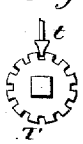

In adjusting the parts it is necessary that the spring-dogs should be held out of engagement with the notched collar. I therefore make the thickness of the heads of the dogs corresponding to the width of the notches, as seen in Fig. 12, and in depth greater than the width of the notches, and so that the dog, when drawn up, as indicated in broken lines, Fig. 10, may be turned to bring the plane of the nose of the dog parallel with the plane of the collar, as seen in Fig. 13. The dog then, presenting a surface broader than the notches, cannot enter either of them. Hence while in that position the collar may be turned in either direction, and when perfect adjustment is attained the dog will be returned and fall into the notch, as seen in Fig. 12, to hold the collar.

I claim—

1. In a drop-hammer, the combination of the mechanism by which the hammer is raised and disengaged when raised, the mechanism which catches and holds the hammer when raised, and the foot-pedal in connection with said mechanism which catches and holds the hammer, whereby the hammer is released, with a second foot-pedal and a rod extending therefrom into connection with the mechanism which raises and disengages the hammer when raised, substantially as described.

2. In a drop-hammer, the combination of a pair of rolls arranged to engage the hammer bar or strap to raise the hammer by the rotation of said rolls, mechanism, substantially such as described, to apply and remove the pressure of said rolls, a pair of clamps arranged to engage the bar or strap of the hammer when raised, and mechanism to release and apply the pressure of said clamps, with a foot-pedal and a rod extending from said pedal into connection with the mechanism by which the rolls are made to engage or release the hammer, substantially as described.

3. In a drop-hammer, the combination of a pair of rolls arranged to engage the hammer bar or strap to raise the hammer by the rotation of said rolls, mechanism, substantially such as described, to apply and remove the pressure of said rolls, a pair of clamps arranged to engage the bar or strap of the hammer when raised, mechanism to release and apply the pressure of said clamps, a foot-pedal in connection with the mechanism which applies the pressure of the rolls to the hammer-strap, in virtue of which the pressure of said rolls may be released at the will of the operator, and a pedal in connection with the mechanism which operates the clamps, free to be worked by the foot independent of the pedal which operates the roll mechanism, the said two pedals arranged relatively to each other, substantially as described, and whereby the depression of the pedal which operates the mechanism which applies the pressure of the rolls will also open clamps and hold the clamps open until the said pedal which operates the roll mechanism is released from the pressure of the foot.

4. In a drop-hammer, the combination of a pair of rolls arranged to engage the hammer bar or strap to raise the hammer by the rotation of said rolls, mechanism, substantially such as described, to apply and remove the pressure of said rolls, a rod in connection with said mechanism, parallel with the path of the hammer, and the adjustable stop P, arranged on said rod so as to be turned out of or into the path of the hammer, as the case may be, substantially as described.

5. In a drop-hammer, the combination of the two lifting-rolls, the driven roll arranged in adjustable boxes, with a wedge arranged against each box on the side opposite the other roll, the wedge on one side inclined in the opposite direction to the wedge on the other side, and the two connected together by a right-and-left screw, whereby a lock adjustment of both ends of the shaft is made, substantially as described.

6. In a drop-hammer, the combination of a pair of rolls arranged to engage the bar or strap by the rotation of said rolls with clamping mechanism arranged to clamp and hold the hammer-bar suspended, the said clamps arranged upon a plate free to be moved independent of said rolls and by the hammer-bar, substantially as and for the purpose described.

7. In a drop-hammer, the lifting mechanism consisting of a pair of rolls arranged to clamp the hammer-bar and by their rotation raise the hammer, the combination therewith of a pair of gears screw-threaded onto the shafts on the respective rolls, substantially as described.

8. In a drop-hammer substantially such as described, the combination of the rod $I^2$, latch $I^5$, and the eccentric stud $I^7$ on said latch, substantially as described.

9. In a drop-hammer, one or both of the uprights arranged upon a seat on the anvil, and adjustable thereon the one with relation to the other, combined with a bolt between the anvil and upright, the nut on the bolt, constructed with a notched collar and provided with a bolt or dog to engage and hold the said collar, said dog arranged to be turned or drawn out of the notch of the collar and ride on the periphery of the collar, substantially as described.

10. In a drop-hammer, one or both of the uprights arranged upon a seat on the anvil, and adjustable thereon the one with relation to the other, combined with an adjusting-screw in the upright, free for rotation, but without longitudinal movement, the screw extending into the anvil, and provided with a notched collar, and a dog to engage the said collar, said dog arranged to be turned or drawn out of the notch of the collar and ride on the periphery of the collar, substantially as described.

NORMAN C. STILES.

Witnesses:
JOS. C. EARLE,
J. H. SHUMWAY.